(12) United States Patent
Niggemann et al.

(10) Patent No.: US 6,367,400 B1
(45) Date of Patent: Apr. 9, 2002

(54) STABILIZATION APPARATUS FOR SHIP MOVEMENT

(75) Inventors: Dirk Niggemann, Bönningstedt; Ulrich Esders, Hamburg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/600,684

(22) PCT Filed: Jan. 11, 1999

(86) PCT No.: PCT/DE99/00029

§ 371 Date: Jan. 29, 2001

§ 102(e) Date: Jan. 29, 2001

(87) PCT Pub. No.: WO99/37533

PCT Pub. Date: Jul. 29, 1999

(30) Foreign Application Priority Data

Jan. 22, 1998 (DE) .......................................... 198 02 354

(51) Int. Cl.$^7$ .............................................. B63B 39/00
(52) U.S. Cl. ........................................ 114/122; 114/275
(58) Field of Search ................................ 114/121, 122, 114/125, 124, 123, 330, 275

(56) References Cited

U.S. PATENT DOCUMENTS

| | | |
|---|---|---|
| 3,738,304 A | 6/1973 | Duberley |
| 4,159,690 A | 7/1979 | Farris |
| 5,631,632 A | 5/1997 | Nakashima et al. |

FOREIGN PATENT DOCUMENTS

| | | |
|---|---|---|
| EP | 0 591 366 | 4/1994 |
| GB | 1047263 | 11/1966 |
| GB | 1413745 | 11/1975 |
| WO | WO 93/00255 | 1/1993 |

OTHER PUBLICATIONS

Shogo Tanaka, "Automatic Measurement of Ship's Attitude by the Use of Servo–Type Accelerometers", IEEE International Conference on Systems Engineering, Sep. 17–19, 1992, pp. 87–90.

Primary Examiner—Jesus D. Sotelo
(74) Attorney, Agent, or Firm—BakerBotts LLP

(57) ABSTRACT

A stabilization apparatus for ship movements has adjustable stabilizers, drive devices by means of which the position of the stabilizers can be adjusted, a control device by means of which control signals corresponding to the required positions of the respective stabilizers can be produced and can be applied to the respective drive device a measurement device by means of which the rolling movements of a ship can be detected and measurement signals corresponding to the detected rolling movements can be produced and can be applied to the control device. In order to provide optimum stabilization. The control device is designed such that a roll angle and a roll angle rate and/or a roll angle acceleration can be detected separately as measured variables or can be determined separately from measured variables, such that a control signal which is produced in the control device in order to compensate for the rolling movement of the ship can be formed from a roll angle component and a roll angle rate component and/or a roll angle acceleration component, and such that the elements of the roll angle component and of the roll angle rate component and/or of the roll angle acceleration component can be preset in the control signal.

15 Claims, 5 Drawing Sheets

STABILIZATION APPARATUS FOR SHIP MOVEMENT

FIELD OF THE INVENTION

The present invention relates to a stabilization apparatus for ship movements. The stabilizer apparatus includes adjustable stabilizers, drive devices by means of which the position of the stabilizers can be adjusted, a control device by means of which control signals corresponding to the required positions of the respective stabilizers can be produced and can be applied to the respective drive device, and a measurement device by means of which the rolling movements of a ship can be detected and measurement signals corresponding to the detected rolling movements can be produced and can be applied to the control device. The control device is designed so that a roll angle and a roll angle rate and/or a roll angle acceleration may be detected separately as measured variables, or may be determined separately from measured variables. A control signal which is produced in the control device in order to compensate for the rolling movement of the ship may be formed from a roll angle component and a roll angle rate component and/or a roll angle acceleration component. The elements of the roll angle components and the roll and rate component and/or the roll angle acceleration component may be preset in the control signal.

BACKGROUND OF THE INVENTION

Eueopean Patent No. EP 0 591 366 describes a stabilization apparatus for ship movements, in which it is possible to compensate for the rolling movements of the ship. To this end, a control signal is produced which is characteristic of the rolling movement of the ship, leads to a specific movement of the stabilizers, and in this way counteracts the undesirable rolling movement of the ship.

Since the weather conditions and thus the requirements for the stabilization apparatus vary widely, the initially mentioned stabilization apparatus is unable to achieve the optimum stabilization result, which results from the physical characteristics, in all conditions.

Great Britain Patent No. GB 1 047 263 describes a stabilization apparatus for ship movements using which roll angle rates and accelerations may also be detected in order to improve the stabilization of the ship movements.

SUMMARY

An object of the present invention is to provide a stabilization apparatus for ship movements which reduces pitching movements of the ship in an optimum manner both in a high sea and in any other weather conditions.

According to an example embodiment of the present invention, the stabilization device includes a measurement apparatus using which the pitching movements of the ship can be detected, measurement signals corresponding to the detected pitching movements can be produced and can be applied to the control device, which is designed such that a pitch angle and/or a pitch angle rate and/or a pitch angle acceleration can be detected separately as measured variables or can be determined separately from measured variables, such that a signal part of the control signal which is produced in the control device in order to compensate for the pitching movement of the ship can be formed from a pitch angle component and/or a pitch angle rate component and/or a pitch angle acceleration component, and such that the elements of the pitch angle component and/or of the pitch angle rate component and/or of the pitch angle acceleration component can be preset as required in that signal part of the control signal which is produced in order to compensate for the pitching movement. The priority circuit with smooth transitions with regard to the reduction in the pitching movements of the ship, also be used to compensate for the rolling movements.

A robust measurement device configuration with correct and reliable measurement signal production is ensured if the measurement devices which are used to detect the rolling and/or yawing and/or pitching movements of the ship are in the form of acceleration sensors.

In order to detect the rolling movements of the ship, it is advantageous for the measurement device for detecting the rolling movement to have three acceleration sensors, one of which is arranged in the region of the ship's longitudinal axis, and the two others are arranged as far as possible to port and starboard, respectively.

Correspondingly, it is advantageous for detection of the pitching movement of the ship for the measurement device which is provided for this purpose to have three acceleration sensors, one of which is arranged in the region of the ship's longitudinal axis and the two others are arranged offset as far as possible toward the bow and stern of the ship, respectively.

In order to detect the yawing movement of the ship as exactly as possible, it is advantageous for the measurement device to have three acceleration sensors, one of which is arranged in the region of the ship's lateral axis and the two others are arranged offset as far as possible toward the bow and stern of the ship, respectively.

In order to reduce the complexity for the measurement devices of the stabilization apparatus according to the present invention as far as possible, it is expedient for one or more acceleration sensors to be designed and arranged such that they can be used to detect the rolling and/or yawing and/or pitching movement of the ship. One acceleration sensor can then be used to detect different ship movements, as a result of which it is possible to reduce the total number of acceleration sensors which are used to form the measurement devices.

The drive devices for moving the stabilizers may be components of a hydraulic system having a reservoir and a constant-pressure pump, in which case the actual filling level of the reservoir of the hydraulic system can be detected as a measured variable, and can be taken into account in the production of the control signal, in the control device of the stabilization apparatus according to the present invention. This allows the priority circuit, to be activated whenever, and always at the right time, the capacity of the stabilization apparatus according to the present invention is not sufficient to suppress the ship movements optimally.

According to a further embodiment of the stabilization apparatus according to the present invention, the capacity of the constant-pressure pump can be simulated, for replenishment of the reservoir, and can be taken into account in the production of the control signal, in the control device.

In order to further optimize the operation of the stabilization apparatus according to the present invention, its control device may have a control section by means of which the drive device power which may be required in order to stabilize the ship movements is adjustable. This allows certain ship movements to be accepted in order to avoid unreasonably high complexity for operation of the stabilization apparatus.

For stabilization of ship movements, stabilizers are moved from their actual position to their required position corresponding to control signals, and the control signals are produced as a function of measurement signals which correspond to the rolling movements of a ship, wherein a roll angle and a roll angle rate and/or a roll angle acceleration are detected or determined separately, and each control signal is produced from a roll angle component and a roll angle rate component and/or a roll angle acceleration component, wherein the element of the roll angle component and of the roll angle rate component and/or of the roll angle acceleration component can be preset as required in the control signal.

In the situation where the drive power available for movement of the stabilizers is insufficient to compensate not only for the roll angle but also for the roll angle rate and for the roll angle acceleration, the compensation for the roll angle, is first reduced then the compensation for the roll angle rate reduced, and then the compensation for the roll angle acceleration reduced.

The reduction in the compensation for the roll angle rate and the roll angle acceleration is introduced before the compensation for the roll angle and for the roll angle rate has been reduced completely.

Furthermore, according to the present invention it is possible for the control signals also to be produced as a function of measurement signals which correspond to pitching movements of the ship, in which a pitch angle and/or a pitch angle rate and/or a pitch angle acceleration are detected and determined separately; each control signal is produced with a signal part, which takes account of the pitching movement of the ship, from a pitch angle component and/or a pitch angle rate component and/or a pitch angle acceleration component, wherein the element of the pitch angle component and/or of the pitch angle rate component and/or of the pitch angle acceleration component can be preset as required on that signal part of the control signal which takes account of the pitching movement of the ship.

In the situation where the drive power available for movement of the stabilizers is insufficient to compensate not only for the pitch angle but also for the pitch angle rate and for the pitch angle acceleration, the compensation for the pitch angle is first reduced, and then the compensation for the pitch angle rate is reduced, and then the compensation for the pitch angle acceleration is reduced.

The reduction in the compensation for the pitch angle rate and the pitch angle acceleration is introduced before the compensation for the pitch angle and for the pitch angle rate has been reduced completely.

In the situation where the drive power available for movement of the stabilizers is insufficient to compensate for the rolling movement and/or the pitching movement of the ship, the compensation for the pitching movement is first reduced.

The reduction in the compensation for the rolling movement can be introduced before the compensation for the pitching movement has been reduced completely.

Furthermore, the control signals may be varied as a function of the ship speed.

The control signals can be attenuated as the speed increases.

The power which may be required to move the stabilizers can be varied as a function of any required or desired compensation for the ship movements.

DETAILED DESCRIPTION

Figure 1:
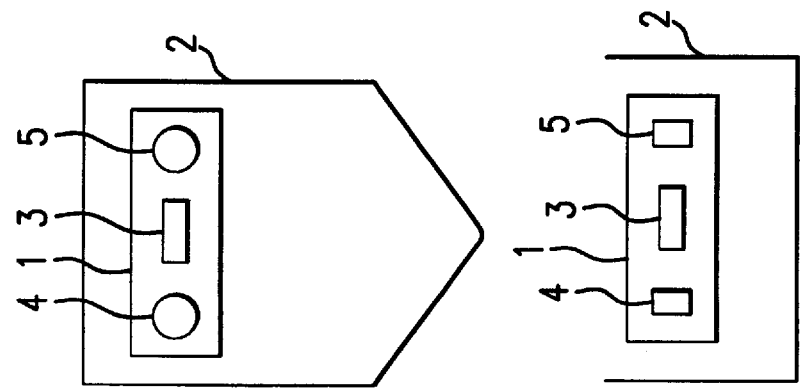
FIG. 1 shows an illustration of a measurement device for detecting the rolling movement of the ship.

FIG. 1 shows the fundamentals of a measurement device 1 for detecting the rolling movement of a ship 2. The measurement device 1 has three acceleration sensors 3, 4, 5, the center one 3 of which is arranged in the region of the ship's longitudinal axis, and the two others 4, 5 are arranged as far as possible to starboard and port, respectively, in the ship 2. This arrangement of the acceleration sensors results in measurement signals with high accuracy and high resolution.

Figure 2:
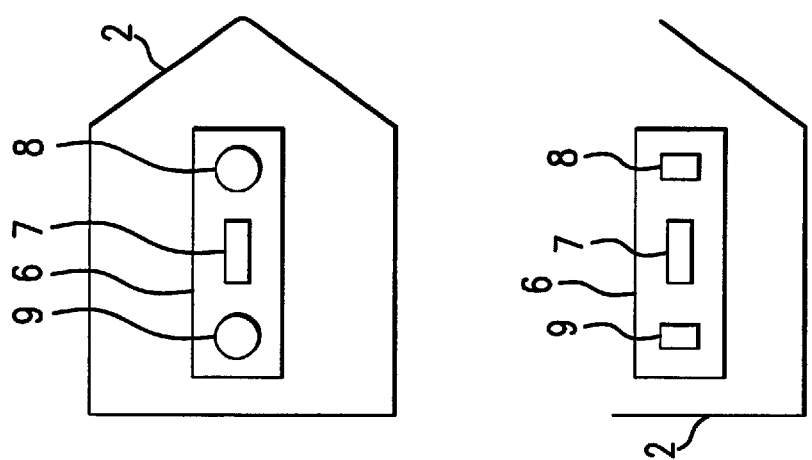
FIG. 2 shows an illustration of a measurement device for detecting the pitching movement of the ship.

A measurement device 6 which is illustrated in FIG. 2, for detecting the pitching movement of the ship 2, likewise has three acceleration sensors 7, 8, 9, one of which is arranged in the region of the ship's longitudinal axis, and the two others are arranged offset as far as possible toward the bow and stern, respectively, of the ship 2. This once again results in the advantages with regard to the measurement signals obtained as described in conjunction with the measurement device 1.

Figure 3:
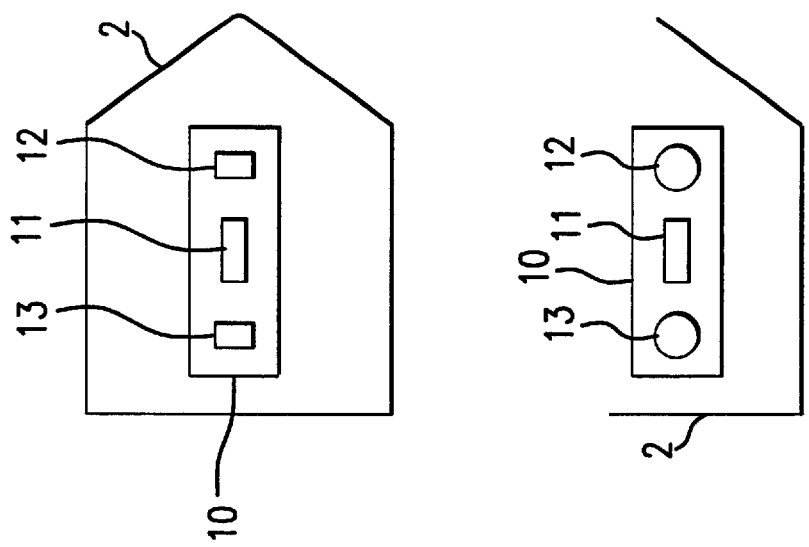
FIG. 3 shows an illustration of a measurement device for detecting the yawing movement of the ship.

A corresponding situation applies to a measurement device 10, which is illustrated in FIG. 3, for detecting the yawing movement by means of acceleration sensors 11, 12, 13, of which the acceleration sensor 11 is arranged approximately in the region of the ship's lateral axis, and the two other acceleration sensors 12, 13 are arranged offset toward the bow and stern, respectively, of the ship 2.

Figure 4:
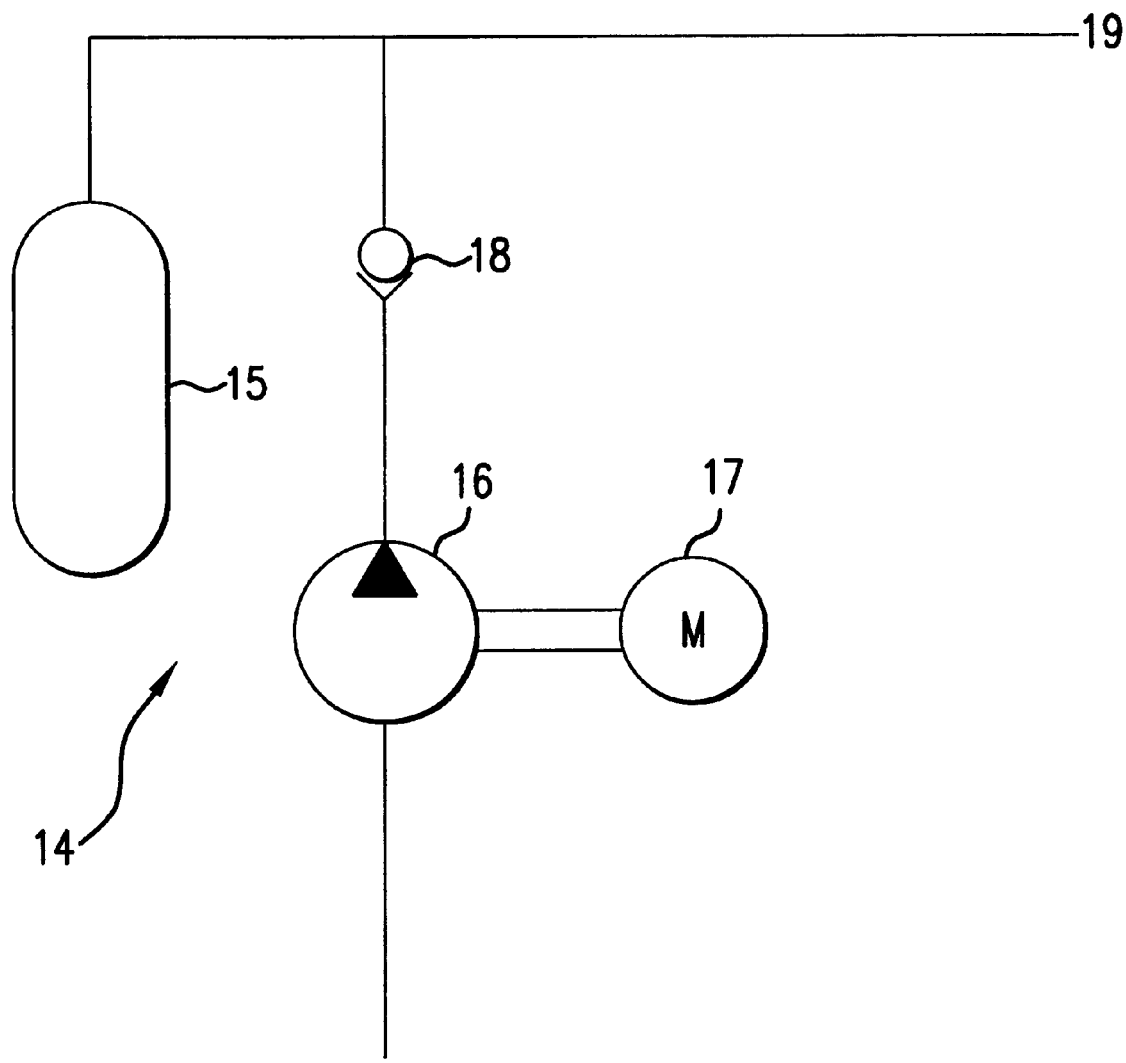
FIG. 4 shows an illustration of a hydraulic system for the stabilization apparatus according to the present invention.

A hydraulic system 14 whose fundamentals are illustrated in FIG. 4 has a reservoir 15 and a constant-pressure pump 16, which is driven by means of a motor 17.

The reservoir 15 has a gas bubble, not illustrated against which the pressure of the hydraulic fluid is built up by means of the constant-pressure pump 16. A non-return valve 18 is arranged between the constant-pressure pump 16 and the reservoir 15. The constant-pressure pump 16 pressurizes the reservoir 15 until the pressure in the part of the hydraulic system 14 on the reservoir side is greater than a pressure which can be preset.

Drive devices 19 are connected to the hydraulic system 14 and are used to move stabilizers, which are not illustrated. Valve arrangements and the like are, of course, provided for this purpose, by means of which the movement of the stabilizers can be controlled and regulated.

Figure 5:
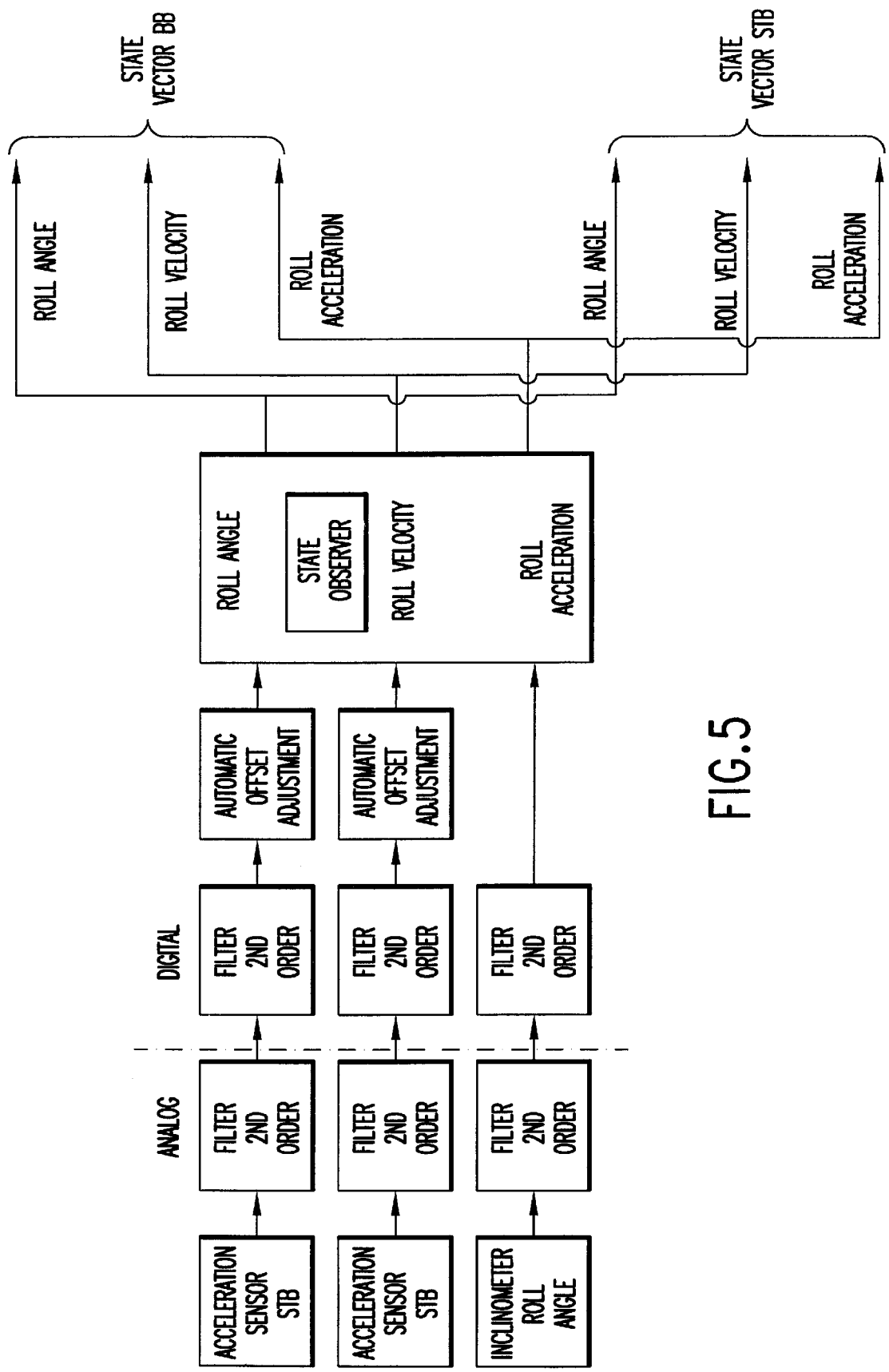
FIGS. 5 to 7 show, by way of example, the control system according to the present invention to compensate for the rolling movement of the ship.

The fundamentals of the stabilization apparatus according to the invention will be described, by way of example with regard to the compensation for the rolling movement of the ship, in the following text with reference to FIGS. 5 to 7.

The acceleration sensor 4 which is arranged on the starboard side provides a measurement signal which is characteristic of the oscillatory movement, which takes place there, about the ship's longitudinal axis; the acceleration sensor 5 which is arranged on the port side correspondingly provides a measurement signal which is characteristic of the oscillatory movement, which takes place there, of the ship about the ship's longitudinal axis. The two acceleration sensors 4, 5 may be accommodated, for example, in a motor switchbox on the port or starboard side, respectively. The acceleration sensor 3 which is arranged in the region of the ship's longitudinal axis is used to determine the ship's heel including the lateral acceleration; for this purpose, it is also in the form of an inclinometer.

A state monitor 20 is used to calculate the roll acceleration, the roll rate and the roll angle from the input variables, namely the starboard vertical acceleration, the port vertical acceleration and the ship's heel, including the lateral acceleration.

In this case, in order to form the said control variables, the state monitor 20 avoids both integration and differentiation, with their specific disadvantages. The signals which are produced are thus free of phase errors over a very wide frequency range.

In an appropriate sea state, the lateral accelerations of the ship make the inclinometer signal provided by the acceleration sensor 3 unusable in their direct form. The signal obtained from the state monitor 20 is very largely free of this component. It is therefore ideally suited for roll angle stabilization. The state monitor 20 simulates the dynamic characteristics of the rolling movement of the ship by means of algorithms. The signals from the acceleration sensors 3, 4, 5 merely form correction values.

Figure 6:
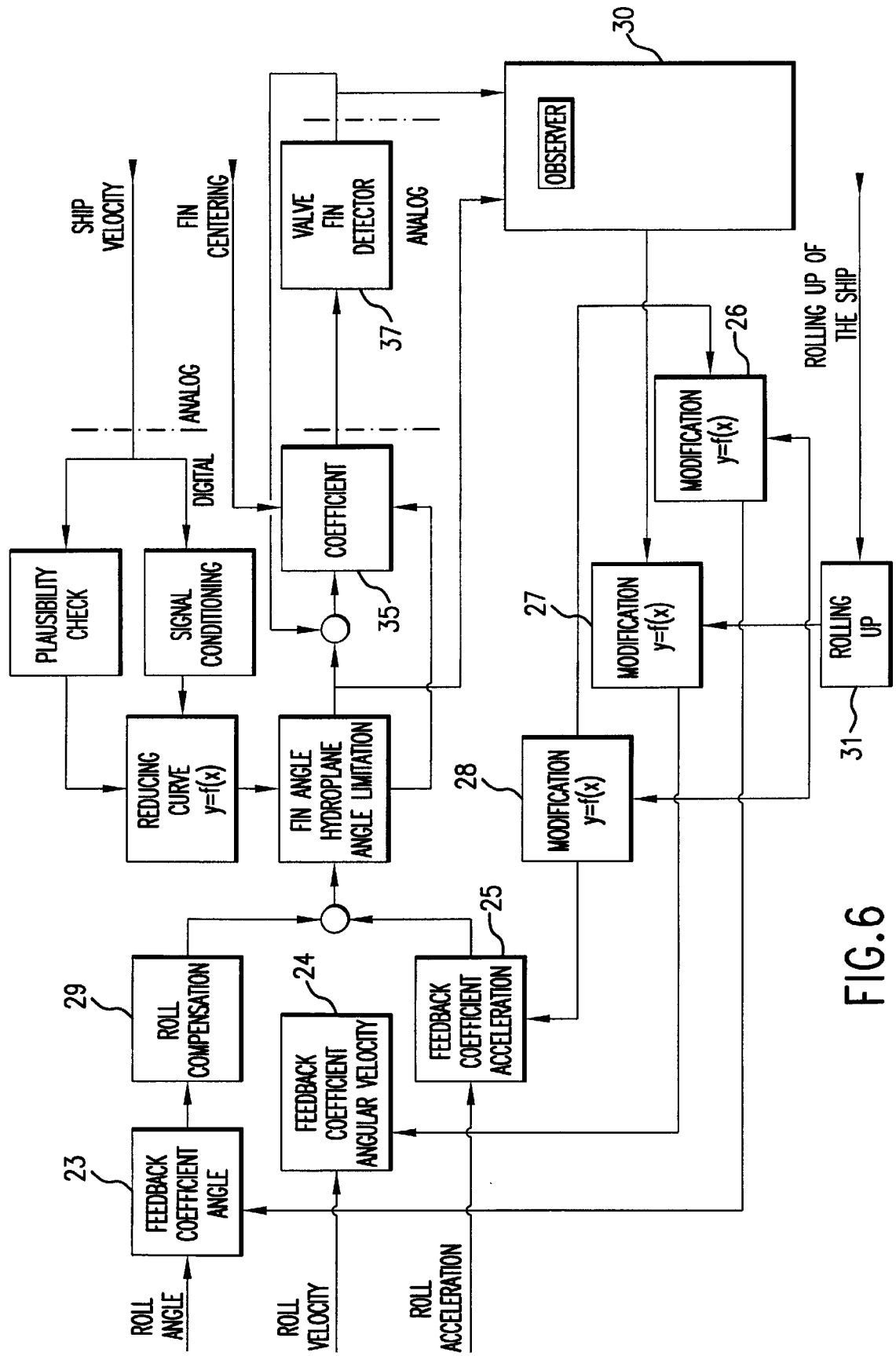

Large controller and feedback coefficients are required in order to achieve high stabilization effectiveness level of, for example, 90% in low and medium sea states; as can be seen from FIG. 6, which describes the control method for the port state vector, the variables calculated in the state monitor 20, namely the roll angle, the roll angle rate and the roll angle acceleration, are weighted separately with feedback coefficients which are respectively associated with them, as is shown in function steps 23, 24, 25.

If the sea is at an angle from the rear and the rudder is not in the central position, slow rolling movements occur, which likewise require large feedback and controller coefficients.

In a high sea state, this then results in over control of the stabilizers, however. This leads to a phase error, which would result in the stabilization power of the stabilization apparatus according to the invention having to be reduced considerably. The controller and feedback coefficients which weight the roll angle, the roll angle rate and the roll angle acceleration in method steps 23, 24 and 25 are therefore be matched to the sea state.

The matching or adaptation method provided according to the invention is a controlled adaptation process. In this case, an auxiliary variable, which is somewhat less than the maximum power of the hydraulic system 14, acts as a reference variable.

The hydraulic power consumed by the stabilizer acts as the control variable. If this is greater than the value of the auxiliary variable, this results in the controller and feedback coefficients being reduced until the power required by the stabilizer matches the available power.

This matching process takes place very quickly—within one movement of the stabilizer from nose up to nose down. Phase errors resulting from over controlled stabilizers are thus reliably avoided, with each stabilizer carrying out its own adaptation process independently of the other stabilizers. This controlled adaptation process is very insensitive to parameter fluctuations.

The weighting of the individual state variables, namely the roll angle, the roll angle rate and the roll angle acceleration, is varied individually depending on the power of the stabilizers. The aim in this case is to use the available stabilizer power optimally. For example, in a high sea, the roll angle element is reduced first of all in favor of the element for the roll angle rate and roll angle acceleration, since the former requires an excessively high hydraulic power level.

The adaptation process output is passed to functions using which the individual controller and feedback coefficients are established, to be precise in the method steps 26, 27, 28.

Heel compensation for the roll angel is also carried out, in method step 29.

The modification method steps 26, 27, 28, which establish the respective controller and feedback coefficients, take into account information, available to a monitor 13 and relating to the position of the respective stabilizers and the stabilizer angle limits. Furthermore, method step 31 results in the rolling of the ship being based on the modification method steps 26, 27, 28.

The coefficient which is finally passed to a position transmitter 37 for the stabilizer according to a method step 35, or the stabilizer position resulting from this, is detected by the monitor 30 and is used for control purposes.

Figure 7:
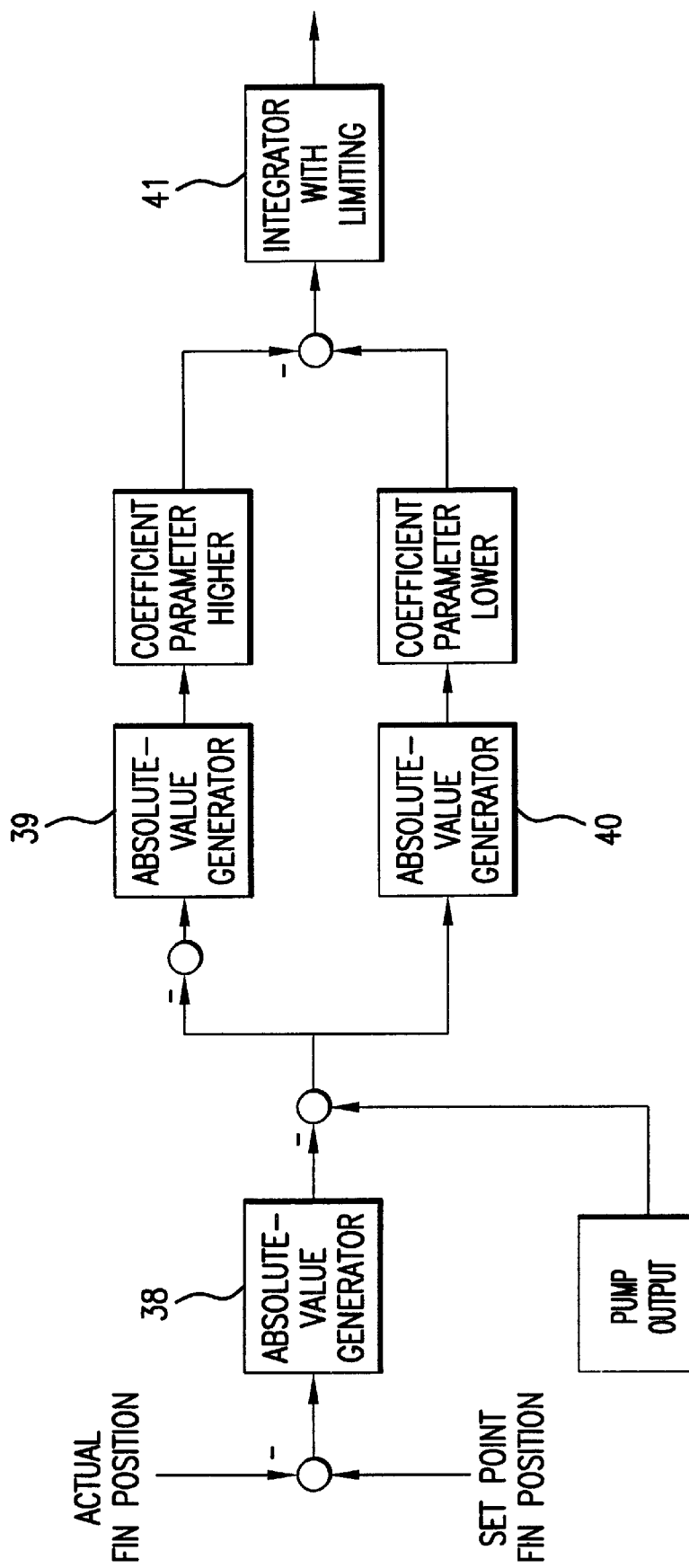

The difference between the ACTUAL stabilizer position and the REQUIRED stabilizer position is passed, as is shown in FIG. 7, to an absolute-value generator 38 and is compared with the available power from the hydraulic system 14. This forms a measure of the demanded hydraulic power.

The absolute-value generators 39, 34 are used to set the coefficient to a higher or lower level, taking account of the parameters, and this is then passed on via an integrator 41 with limiting.

The stabilization apparatus according to the invention as described above, in order to compensate for or reduce rolling movements of the ship, result in high stabilization performance levels both in the case of short waves, that is to say when the sea is at an angle from the front, and in the case of long waves, that is to say when the sea is at an angle from astern.

Automatic adaptation of the control system to the respective ship, stabilizer and sea-state parameters is ensured by weighting all the state variables separately. The controller coefficients are each limited to a maximum value. The values correspond to optimum stabilization in a low sea, and are well away from the stability limits. The adaptation process only allows the controller coefficients to be reduced. The automatic adaptation process results in the available power for the stabilizers being used optimally for a high stabilization performance level in all sea-state conditions. In low and medium sea states, for example, a roll reduction of up to 90% is achieved. Over control of the stabilizers is prevented in high sea states.

What is claimed is:

1. A stabilization apparatus for ship movements, comprising:
   adjustable stabilizers;
   drive devices to adjust a position of the stabilizers;
   a control device that produces control signals corresponding to required positions of the stabilizers, the control signals being provided to the drive devices;
   a first measurement device by which rolling movements of the ship are detected, and measurement signals corresponding to the detected rolling movements are generated and provided to the control device, and wherein said first measurement device a) separately detects as measured variables at least one of: i) roll angle, ii) a roll angle rate, and iii) a roll angle acceleration, and b) separately determines from the measured variables at least one of: i) the roll angle, ii) the roll angle rate, and iii) the roll angle acceleration, so that the control signals produced in the control device in order to compensate for the rolling movements of the ship are formed from at least one of: i) a roll angle component, ii) a roll angle rate component, and iii) a roll angle acceleration component, and further wherein at least one of the roll angle component, the roll angle rate component and the roll angle acceleration component is capable of being preset in the control signals; and a second measurement device by which pitching movements are detected and measurement signals corresponding to the detected pitching movements are generated and provided to the control device, wherein the second measurement device a) separately detects as measured variables at least one of: i) a pitch angle, ii) a pitch angle rate, and iii) a pitch angle acceleration, and b) separately determines from the measured variables at least one of: i) the pitch angle, ii) the pitch angle rate, and iii) the pitch angle acceleration so that the control signals produced in the control device in order to compensate for the pitching movements of the ship are formed from at least one of: i) a pitch angle component, ii) a pitch angle rate component, and iii) a pitch angle acceleration component and further wherein at least one of the pitch angle component, the pitch angle rate component, and the pitch angle acceleration component is capable of being preset in the signal part of the control signal.

2. The stabilization apparatus according to claim 1, wherein the first measurement device and the second measurement device include acceleration sensors.

3. The stabilization device according to claim 1, wherein the first measurement device includes three acceleration sensors, a first one of the three acceleration sensors being arranged in a region of a longitudinal axis of the ship, a second one of the acceleration sensors being arranged in a region of a port side of the ship, and a third one of the acceleration sensors being arranged in a region of a starboard side of the ship.

4. The stabilization device according to claim 1, wherein the second measurement device includes three acceleration sensors, a first one of the acceleration sensors being arranged in a region of a longitudinal axis of the ship, a second one of the acceleration sensors being arranged in a region of a bow end of the ship, and a third one of the acceleration sensors being arranged in a region of a stern end of the ship.

5. The stabilization device according to claim 1, further comprising:
three acceleration sensors to detect a yawing movement of the ship, a first one of the acceleration sensors being arranged in a region of a lateral axis of the ship, a second one of the acceleration sensors being arranged in a bow end of the ship, and a third one of the acceleration sensors being arranged in a region of a stern end of the ship.

6. The stabilization device according to claim 1, further comprising:
at least one acceleration sensor arranged to detect at least one of: i) the rolling movements of the ship, ii) yawing movements of the ship, and iii) pitching movements of the ship.

7. The stabilization device according to claim 1, further comprising:
a hydraulic system, the drive devices being components of the hydraulic system, the hydraulic system including a reservoir and a constant-pressure pump, the control device taking into account an actual filling level of the reservoir in producing the control signals.

8. The stabilization device according to claim 7, wherein the control device takes into account a capacity of the constant-pressure pump in producing the control signals.

9. The stabilization device according to claim 1, further comprising:
a control section adjusting power of the drive devices.

10. A method for stabilizing movements of a ship, comprising:
separately determining at least one of: i) a roll angle, ii) a roll angle rate, and iii) a roll angle acceleration;

producing control signals as a function of measurement signals corresponding to rolling movements of the ship, the control signals being produced as a function of at least one of: i) a roll angle component, ii) a roll angle rate component, and iii) a roll angle acceleration component as a function of the at least one of the roll angle, the roll angle rate, and the roll angle acceleration, an element of the at least one of the roll angle component, roll angle rate component, and roll angle acceleration component being presettable in the control signals;

moving stabilizers from an actual position to a required position corresponding to control signals; and if drive power available for moving the stabilizers is insufficient to compensate for the roll angle, the roll angle rate and the roll angle acceleration:
reducing the compensation for the roll angle, and
after reducing the compensation for the roll angle, reducing the compensation of the roll angle rate and reducing the compensation of the roll angle acceleration.

11. The method according to claim 10, wherein the roll angle rate and the roll angle acceleration are reduced before the roll angle and the roll angle rate have been reduced completely.

12. The method according to claim 10, wherein the step of producing the control signals includes producing the control signals as a function of measurement signals corresponding to pitching movements of the ship, and further comprising:
determining at least one of: i) a pitch angle, ii) a pitch angle rate, and iii) a pitch angle acceleration, each of the control signals being produced with a signal part which is determined as a function of at least one of: i) a pitch angle component, ii) a pitch angle rate component, and iii) a pitch angle acceleration component, using the at least one of the pitch angle, the pitch angle rate and the pitch angle acceleration, an element of the at least one of the pitch angle component, pitch angle rate component and pitch angle acceleration being presettable in the signal part.

13. The method according to claims 12, further comprising:
if the drive power available for movement of the stabilizers is insufficient to compensate for the pitch angle, the pitch angle rate, and the pitch angle acceleration:
reducing a compensation for the pitch angle, and
after reducing the compensation for the pitch rate, reducing a compensation for the pitch angle rate and the pitch angle acceleration.

14. The method according to claim 13, wherein the compensation for the pitch angle rate and the compensation for the pitch angle acceleration is reduced before the compensation for the pitch angle and the pitch angle rate has been reduced completely.

15. The method according to claim 10, further comprising:
varying power required to move the stabilizers as a function of any compensation for the ship movements.

* * * * *